US007142302B2

(12) United States Patent
Magarill et al.

(10) Patent No.: US 7,142,302 B2
(45) Date of Patent: Nov. 28, 2006

(54) LIGHT SOURCE SPECTRA FOR PROJECTION DISPLAYS

(75) Inventors: Simon Magarill, Cincinnati, OH (US); Todd S. Rutherford, Cincinnati, OH (US)

(73) Assignee: 3M Innovative Properties Company, St. Paul, MN (US)

( * ) Notice: Subject to any disclaimer, the term of this patent is extended or adjusted under 35 U.S.C. 154(b) by 421 days.

(21) Appl. No.: 10/695,844

(22) Filed: Oct. 29, 2003

(65) Prior Publication Data

US 2004/0125376 A1 Jul. 1, 2004

Related U.S. Application Data

(60) Provisional application No. 60/423,032, filed on Nov. 1, 2002.

(51) Int. Cl.
  *G01N 21/25* (2006.01)
  *G03B 21/00* (2006.01)
(52) U.S. Cl. .................. 356/416; 356/419; 353/31
(58) Field of Classification Search ................ 356/416, 356/419, 406; 348/742–744; 353/31
See application file for complete search history.

(56) References Cited

U.S. PATENT DOCUMENTS 4,978,891 A 12/1990 Ury

| 5,404,076 | A | 4/1995 | Dolan et al. |
| 5,526,063 | A | 6/1996 | Joubert et al. |
| 6,697,197 | B1 * | 2/2004 | Sedlmayr ..................... 359/485 |
| 2002/0011802 | A1 | 1/2002 | Espiau et al. |
| 2003/0001990 | A1 | 1/2003 | Magarill et al. |

OTHER PUBLICATIONS

"The photonics design and applications handbook" 2001 Laurin Publishing XP002274780 pp. 39-41.
Monch, et al., "Optimized Light Sources for Projection Displays", SID 99, p. 1076-1079.
Smith, Chapter 8 of Warren J. Smith, Modern Optical Engineering: The Design of Optical Systems, in Optical and Electro-Optical Engineering Series, Robert E. Fischer and Warren J. Smith editors, $2^{nd}$ edition, McGraw-Hill, New York, 1990, pp. 205-233.
Society of Motion Picture and Television Engineers: Recommended Practice, RP 145-1999 entitled "SMPTE C Color Monitor Colorimetry." (Apr. 23 1999).
Stupp, et al., "Projection Displays," Wiley, 1999, p. 310-312.

* cited by examiner

*Primary Examiner*—Hwa (Andrew) Lee
*Assistant Examiner*—Marissa J. Destchel
(74) *Attorney, Agent, or Firm*—George W. Jonas

(57) ABSTRACT

Methods are provided for optimizing the spectrum of a light source used in a projection display system in order to reduce the light loss associated with color splitting/recombination in the system. Projection systems designed in accordance with such methods are also disclosed.

27 Claims, 3 Drawing Sheets

LIGHT SOURCE SPECTRA FOR PROJECTION DISPLAYS

CROSS REFERENCE TO RELATED PROVISIONAL APPLICATION

This application claims the benefit under 35 USC §119(e) of U.S. Provisional Application No. 60/423,032, filed Nov. 1, 2002, the contents of which are incorporated herein in their entirety.

FIELD OF THE INVENTION

This invention relates to the source of light used in projection optical systems and, in particular, in flat panel projection optical systems. See, for example, U.S. Patent Application Publication No. US 2003/0001990 entitled "Scrolling Color Sequential Illumination System," the contents of which are incorporated herein by reference.

BACKGROUND OF THE INVENTION

In a color projection display the light from the lamp is divided into red, green and blue color channels, then modulated in each channel independently and finally recombined in one image on the screen. In other words, color maintenance in projection display consists of two steps: color splitting and color recombination. The color channels can be spatially separate (e.g., a three-panel display) or separated in time (e.g., a single-panel display).

Color splitting must provide the required (desired) color purity in each channel, which can be quantified with the color coordinates described in E. Stupp and M. Brennesholtz, "Projection Displays," Wiley, 1999, p. 310–312. Color recombination from all three channels must give the required (desired) white color, which also can be described with color coordinates or color temperature. One common color standard is set forth in Society of Motion Picture and Television Engineers: Recommended Practice, RP 145-1999 entitled "SMPTE C Color Monitor Colorimetry."

SUMMARY OF THE INVENTION

The spectrum of the light source and the wavelength dependent transmission of all the optical elements in a channel determine the light spectrum of the channel. In most cases the optical design includes spectral filters that alter the spectrum to achieve the desired color coordinates. Accurate selection of such filters provides the required (desired) color purity for almost any given spectrum of the light source assuming, of course, that the source emits light over the entire visible range of the spectrum.

Color recombination is the process of mixing light coming from the three different channels. In order to reach the desired white point, the proportion of light from each channel that is used is adjusted. In other words, the light power in one or two channels is reduced.

In accordance with the invention, this loss of light due to color requirements is estimated (simulated) using an algorithm of the following type:

All photopic weighted energy from the light source (measured in lumens) is taken as 100%. A discussion of photometry, including photopic weighting, can be found in Chapter 8 of Warren J. Smith, Modem Optical Engineering: The Design of Optical Systems, in Optical and Electro-Optical Engineering Series, Robert E. Fischer and Warren J. Smith editors, $2^{nd}$ edition, McGraw-Hill, New York, 1990, pp. 205–233; see in particular Section 8.9. Briefly, the photopic weighted energy of a source is obtained by taking the source's spectrum ($S(\lambda)$) and mathematically passing it through a filter having the sensitivity of the human eye.

Ideal color filters are assumed to split the light into three primary color channels having the required (desired) color purity in each individual channel. The characteristics of these ideal filters are assumed to be: 100% transmission in desired spectral area and 0% transmission everywhere outside of such area. No losses associated with absorption, Fresnel reflections, polarization, or diffraction are taken into consideration, although, if desired, they can be.

All three primary colors are mixed together in the proportion required to provide the correct (desired) white point. The photopic weighted energy of the mixed light is then computed as a percentage of the photopic weighted energy of the light emitted from the source.

This approach allows the evaluation of the loss of light in the system associated with color maintenance only.

For example, the most common lamp used in projection displays is the UHP lamp (see H. Monch, G. Derra, E. Fisher, Optimized Light Sources for Projection Displays, SID 99, p. 1076–1079), which has a spectrum of the type shown in FIG. 1. (The spectrum shown in FIG. 1 corresponds to $S(\lambda)$ of FIG. 3 and thus is measured in watts as opposed to lumens. In FIG. 1, the spectrum is shown in relative units.) After splitting this light into three channels (with required (desired) color purity) and then recombining all of the light into one image, the white screen looks unacceptable (very greenish). In order to provide the required (desired) quality of the white light, the intensity of light in the green and blue channels must be reduced. As a result, the display is dimmer. The efficiency associated with color maintenance in the system with this lamp is typically about 70%. In other words, 30% of the light is lost due to the non-ideal spectrum of the light source.

In accordance with the invention, to reduce or minimize the light loss in a projection display, the spectrum of the light source is selected and/or adjusted to take into account 1) the required (desired) color purity of the red, green, and blue channels and 2) the required (desired) white color of the recombined light.

The quality (i.e., spectral energy distribution) of the light provided by lamps of the types currently in use in flat panel projection systems is not sufficient to ensure that the lamp can be used efficiently to create the desired white color at the screen. In accordance with the invention, the additional constraint imposed by the need to reach the correct colors in the red, green and blue channels is considered in selecting and/or designing lamps for use in projection systems. The spectra of current lamps do not take this into account, which results in reduced efficiency when they are used in a projection system.

For the step of color splitting, one needs to use color filters to satisfy the requirements of color purity in each channel. But for the step of color recombination, in accordance with the invention, the goal is preferably not to use any filters: that is, the goal is to use all the available light from all the channels, mixed together to get the required white point. (Note that in the case where the color channels are spatially split using dichroic filters/mirrors, "no loss" recombination can, at least theoretically, be achieved by using combining dichroics having characteristics equal to the splitting dichroics.) An appropriate choice of the starting spectrum of the lamp allows the color recombination step to reach the desired white point with preferably essentially no loss of light.

As used herein, an ideal filter is a hypothetical element with 100% transmission in a certain spectral range and 0% transmission elsewhere. An example of the transmission factor across the visible spectrum for an ideal green filter is shown in FIG. 2. Similar graphs apply to ideal red and blue filters, with the red filter passing wavelengths above a preselected value, e.g., above 588 nm, and absorbing wavelengths below that value, and the blue filter passing wavelengths below a preselected value, e.g., 494 nm, and absorbing wavelengths above that value. In terms of actual filters, the transmission cutoff points for the ideal filters (i.e., the wavelengths at which transmission goes from all on to all off) can be taken to be equal to the 50% transmission points for the corresponding actual filters.

In accordance with the invention, the spectrum of the lamp and the characteristics of the ideal filters are chosen to achieve calculated ideal color coordinates for the individual color channels and for the white light that results from mixing all three colors together on the screen.

More particularly, in accordance with a first aspect of the invention, a method for determining a target spectrum for a light source to be used in a projection system is provided which comprises:

(A) specifying desired color coordinates for red light, green light, and blue light;

(B) specifying desired color coordinates for white light produced by the system's splitting/filtering/recombining process (the "recombined white light");

(C) specifying a set of filter characteristics for the system's red, green, and blue filters; and (D) determining either (i) a target spectrum for the light source or (ii) a combination of a target spectrum for the light source and a revised set of filter characteristics for the red, green, and blue filters based on a combination of criteria which includes:

(a) reducing differences between calculated color coordinates for filtered red light, filtered green light and filtered blue light and the specified desired color coordinates for those lights;

(b) reducing differences between calculated color coordinates for recombined white light and the specified desired color coordinates for that light; and (c) increasing calculated light transmission efficiency for the splitting/filtering/recombining process.

In some embodiments of the invention, one or more of the following more exacting criteria are also applied:

(a) minimizing differences between calculated color coordinates for filtered red light, filtered green light and filtered blue light and the specified desired color coordinates for those lights;

(b) minimizing differences between calculated color coordinates for recombined white light and the specified desired color coordinates for that light; and (c) maximizing calculated light transmission efficiency for the splitting/filtering/recombining process.

In certain preferred embodiments of the invention, the target spectrum for the light source obtained in this way is used as a guideline for constructing a projection system. Preferably, such a projection system has a calculated light transmission efficiency for its splitting/filtering/recombining process of at least 75%, more preferably, at least 85%, and most preferably, at least 95%.

In accordance with a second aspect, the invention provides a projection system which comprises a light source and a plurality of color filters wherein:

(A) the light source has a measured distribution of optical power as a function of wavelength $S(\lambda)$;

(B) the light source has a photopic weighted intensity $Y(\lambda)$ obtained by mathematically filtering $S(\lambda)$ with a filter having the sensitivity of the human eye;

(C) the color filters have measured 50% cutoff points; and (D) when:

(i) the measured 50% cutoff points are used to define ideal filters, (ii) the ideal filters are mathematically applied to $S(\lambda)$ to produce a plurality of filtered lights, and (iii) the plurality of filtered lights are mathematically combined to produce simulated white light, the simulated white light so obtained has a calculated photopic weighted intensity $Yb(\lambda)$ the integral of which over the visible spectrum is at least 75%, preferably at least 85%, and most preferably at least 95%, of the integral of $Y(\lambda)$ over the visible spectrum, where the visible spectrum is taken to extend from 390 nm to 770 nm.

Additional features of the invention are set forth in the detailed description which follows, and in part will be readily apparent to those skilled in the art from that description or recognized by practicing the invention as described herein. The accompanying drawings are included to provide a further understanding of the invention, and are incorporated in and constitute a part of this specification. It is to be understood that both the foregoing general description and the following detailed description are merely exemplary of the invention and are intended to provide an overview or framework for understanding the nature and character of the invention.

DETAILED DESCRIPTION OF THE INVENTION

Figure 1:
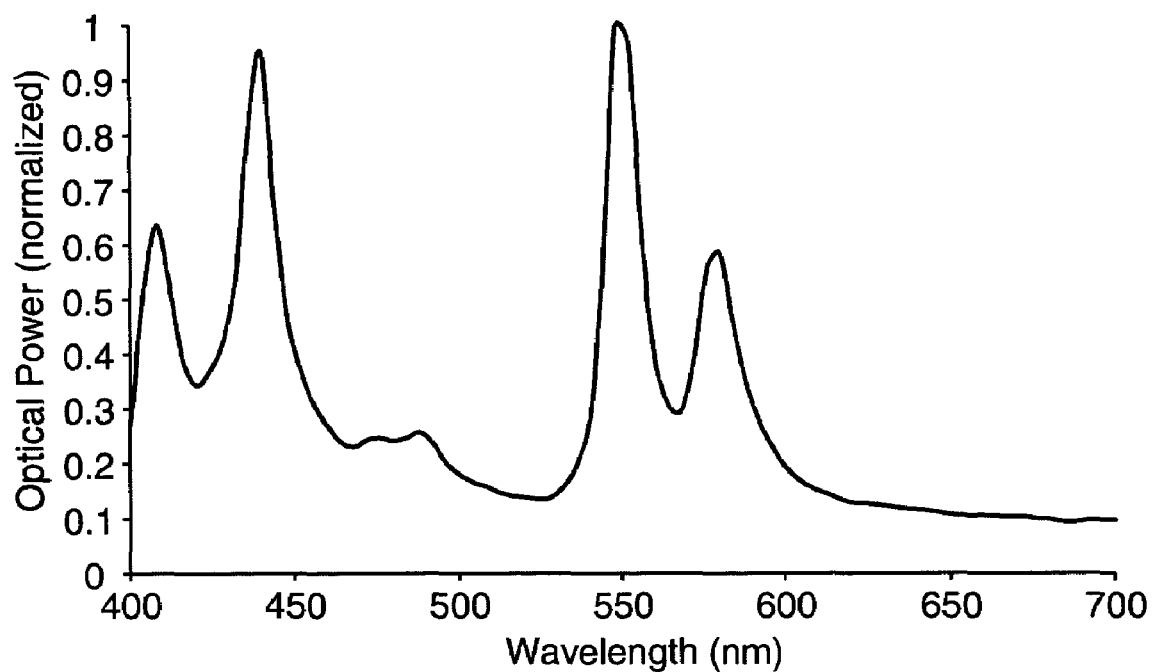
FIG. 1 shows a spectrum of a UHP lamp.
Figure 2:
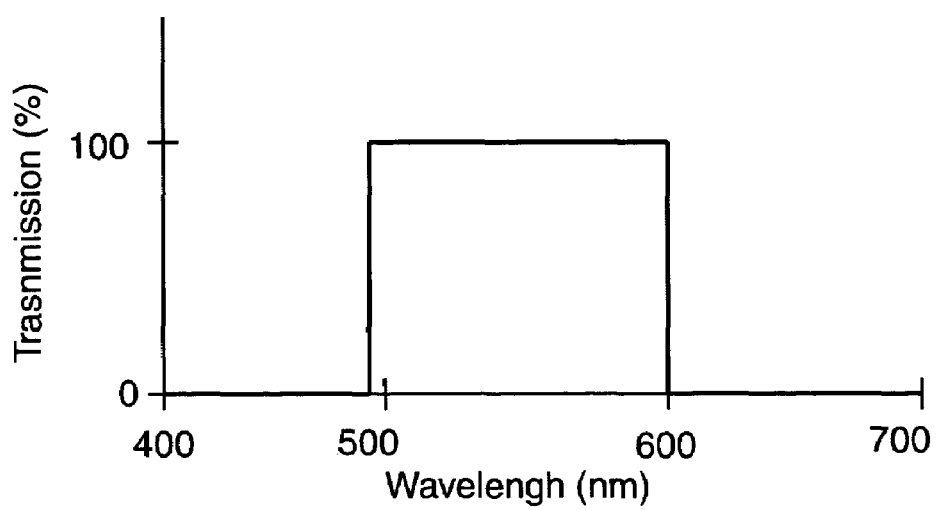
FIG. 2 shows the transmission factor across the visible spectrum for an ideal green filter.
Figure 3:
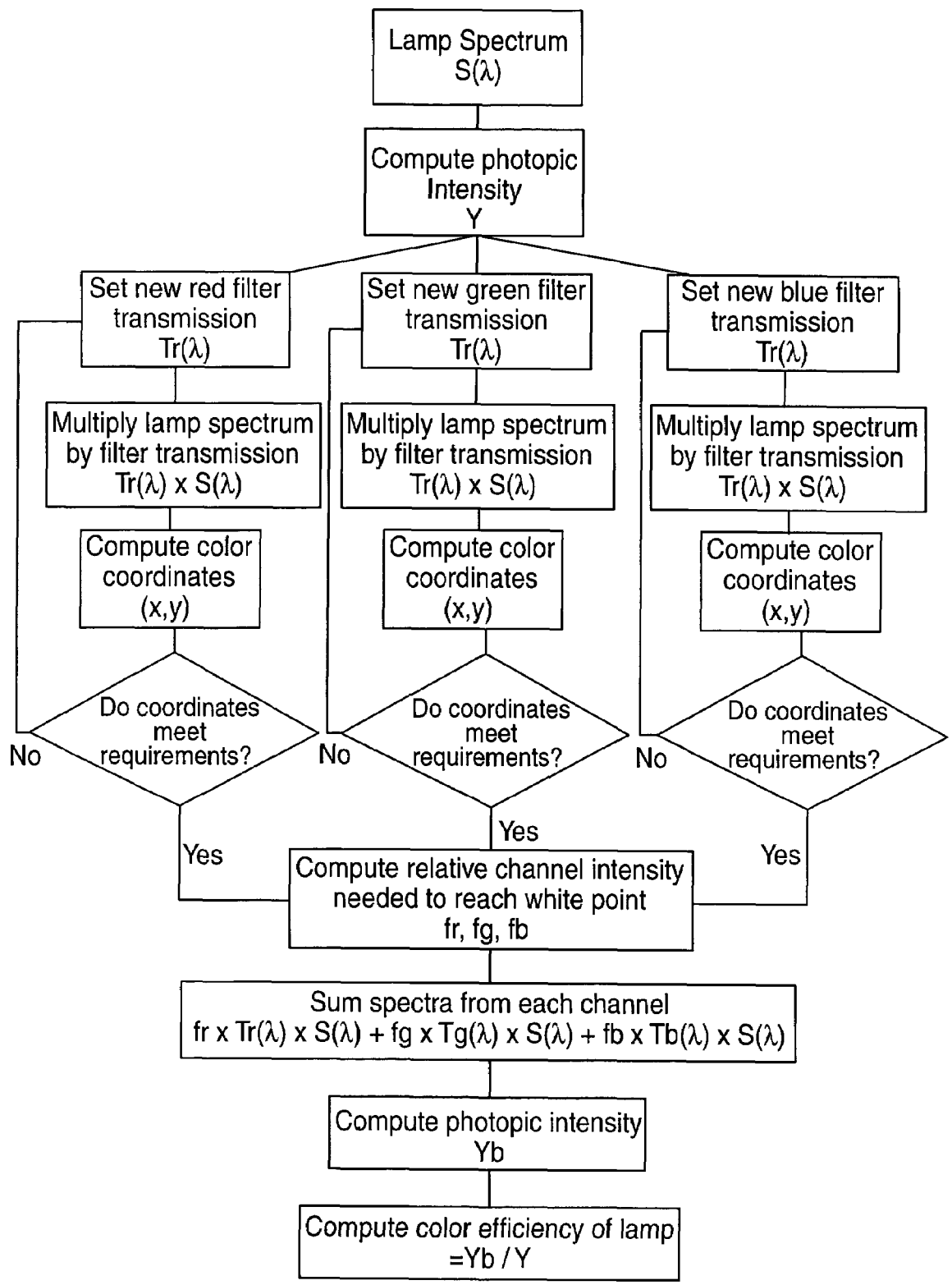
FIG. 3 shows a flowchart of calculation for selecting a lamp spectrum and the characteristics of ideal filters to reduce light loss in a projection display.

To select (1) the lamp spectrum and (2) appropriate characteristics of the ideal filters, calculations are preferably performed on a programmed computer in accordance with a flowchart of the type shown in FIG. 3. The mathematical operations described in FIG. 3 can be performed using a variety of computers and software well-known to those skilled in the art, e.g., a conventional desktop or portable computer and a commercially available scientific computing program.

The spectrum of the lamp and the characteristics of the filters are iteratively adjusted so as to identify, using the calculation process of FIG. 3, one or more combinations of a lamp spectrum and a set of filter characteristics (e.g., a set of cutoff wavelengths) which will provide minimum loss (highest efficiency) through the color splitting/recombination process.

Examples of the variables of the system that can be adjusted include:
1) spectrum of the lamp;
2) cutoff point for blue filter;
3) left cutoff point for green filter;
4) right cutoff point for green filter;
5) cutoff point for red filter.

The targets that are to be achieved are:
1) color coordinates of blue light;
2) color coordinates of green light;
3) color coordinates of red light;
4) color coordinates of white light;
5) loss associated with color splitting/recombination should be reduced or minimized.

The optimized spectrum of the lamp and the characteristics of ideal filters so obtained using an algorithm of the type described above are then used to select and/or design actual lamps and filters for use in constructing a flat panel display. The actual lamps and filters need not and, in general, will not exactly match the theoretical characteristics obtained through the use of the algorithm but by using the theoretical values as a guide, improved efficiency compared to existing lamp/filter combinations is achieved.

Figure 4:
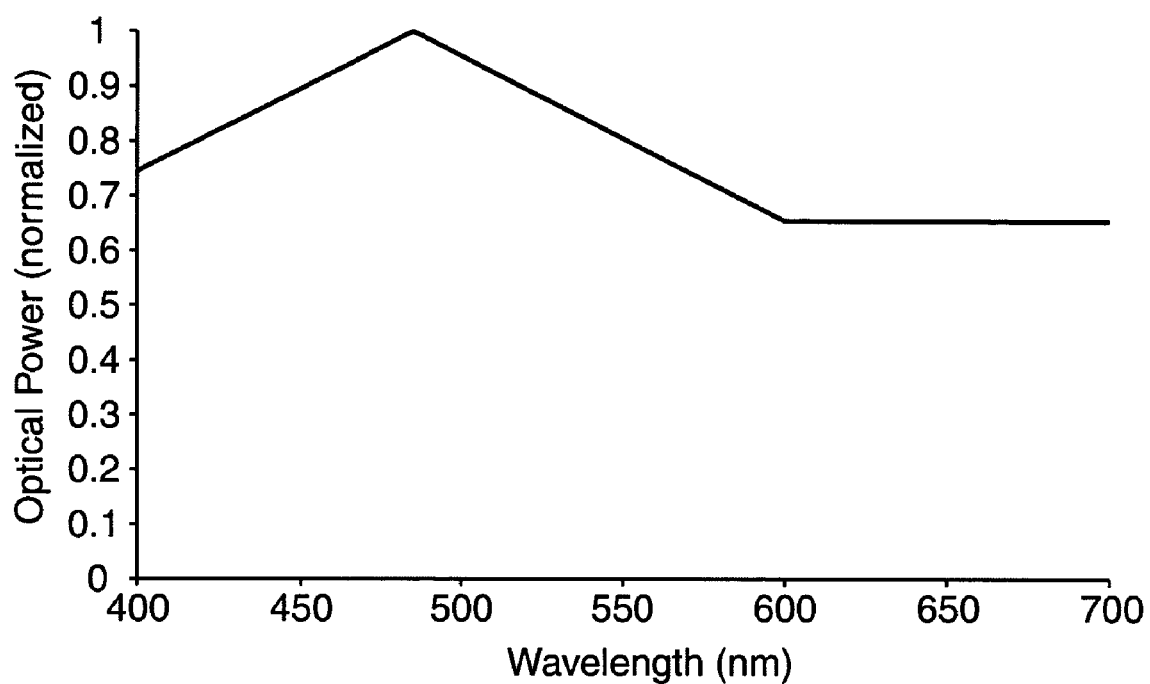
FIG. 4 shows an optimized spectrum of a light source, specifically, an ideal (theoretical) lamp spectrum, determined in accordance with the invention using the procedures of the flowchart of FIG. 3. In particular, this spectrum is designed to achieve SMPTE C color points with reduced or minimized light loss in a projection display system.

An example of an optimized theoretical lamp spectrum obtained using the algorithm of FIG. 3 is shown in FIG. 4. This spectrum was obtained by starting with a flat spectrum and then iteratively performing the procedure of FIG. 3 until the purities of the red, green, and blue channels, the color coordinates of the white light produced by combining the channels, and the overall efficiency of the system had reached acceptable levels. Note that this spectrum is not a unique solution, but other solutions will maintain the general character of the example spectrum. Characteristics of the ideal color filters which were used in the determination of the spectrum of FIG. 4 are listed in Table 1. (Note that the overlapping of the spectra for the different channels in Table 1 (i.e., 484/494 nm for blue/green and 588/599 nm for green/red) can be accommodated in a sequential system where the color channels are separated in time or by using different polarizations in different channels for a spatially separated, three-panel display system.) Obtained color coordinates in the individual channels and for the white point after color recombination are listed in Table 2. Also this table has reference data from the SMPTE C standard.

This system (lamp and ideal filters) demonstrates color maintenance efficiency of 98%.

The foregoing is a simplified example for purposes of illustration. To calculate the requirements for an optimized lamp spectrum for an actual system, one will preferably take into consideration the actual, as opposed to ideal, characteristics of the filters used and other design parameters of the system. However, the above example demonstrates that the spectrum of the light source is a powerful variable that can be used to great advantage in display systems to reduce or minimize light loss.

It should be noted that the number of available adjustable variables will typically be less than the number of parameters describing the desired targets. In practical terms, this means that the procedure of FIG. 3 will typically be stopped at a point where the calculated efficiency is less than 100%, i.e., in applying the algorithm, achieving the desired color coordinates of the red, green, and blue channels and of the combined white light is typically and preferably given precedence over achieving the absolute highest efficiency.

One of the possible sources of light that could be optimized in accordance with the techniques described herein is the plasma lamp described in Espiau et al., U.S. Patent Application Publication No. US 2002/0011802 A1. The spectrum of this lamp depends on its gas mixture, which emits light after activation with an RF electromagnetic field. The recipe of the gas mixture can be changed to provide the required spectrum. See, for example, U.S. Pat. Nos. 4,978,891 and 5,404,076. Although less desirable, combinations of lamps, LED's, or lamps and LED's can be used to achieve the desired overall spectrum for the projection system's light source.

Projection systems designed in accordance with the foregoing have the following characteristics:
(1) they comprise a light source and a plurality of color filters;
(2) the light source has a measured distribution of optical power as a function of wavelength $S(\lambda)$;
(3) the light source has a photopic weighted intensity $Y(\lambda)$ obtained by mathematically filtering $S(\lambda)$ with a filter having the sensitivity of the human eye;
(4) the color filters have measured 50% cutoff points; and
(5) when:
(i) the measured 50% cutoff points are used to define ideal filters,
(ii) the ideal filters are mathematically applied to $S(\lambda)$ to produce a plurality of filtered lights, and
(iii) the plurality of filtered lights are mathematically combined to produce simulated white light, the simulated white light so obtained has a calculated photopic weighted intensity $Yb(\lambda)$ the integral of which over the visible spectrum is at least 75%, preferably at least 85%, and most preferably at least 95% of the integral of $Y(\lambda)$ over the visible spectrum, where the visible spectrum is taken to extend from 390 nm to 770 nm.

Although specific embodiments of the invention have been described and illustrated, it is to be understood that a variety of modifications which do not depart from the scope and spirit of the invention will be evident to persons of ordinary skill in the art from the foregoing disclosure.

TABLE 1

CHARACTERISTICS OF IDEAL FILTERS

| Filter | Blue | Green | Red |
|---|---|---|---|
| cutoff point | 494 nm | 484 nm & 599 nm | 588 nm |

TABLE 2

ACHIEVED AND REQUIRED 1931 CIE COLOR COORDINATES

| Channels | Red | Green | Blue | White |
|---|---|---|---|---|
| Achieved | x = 0.663<br>y = 0.336 | x = 0.309<br>y = 0.596 | x = 0.142<br>y = 0.048 | x = 0.312<br>y = 0.329 |
| Required* | x = 0.630<br>y = 0.340 | x = 0.310<br>y = 0.595 | x = 0.155<br>y = 0.070 | x = 0.3127<br>y = 0.3290 |

*See E. Stupp and M. Brennesholtz, "Projection Displays," Wiley, 1999, p. 310–312, and Society of Motion Picture and Television Engineers: Recommended Practice, RP 145–1999 entitled "SMPTE C Color Monitor Colorimetry."

What is claimed is:

1. A method for determining a target spectrum for a light source to be used in a projection system in which light from the light source is:

1) split into sub-portions either spatially or in time,
2) the sub-portions are filtered through red, green, and blue filters, and
3) the filtered sub-portions are recombined as a colored image on a screen said method comprising:
A) specifying desired color coordinates for red light, green light, and blue light;
B) specifying desired color coordinates for white light produced by way of steps 1 to 3;
C) specifying a set of filter characteristics for the red, green, and blue filters; and
D) determining either
  i) a target spectrum for the light source or
  ii) a combination of a target spectrum for the light source and a revised set of filter characteristics for the red, green, and blue filters based on a combination of criteria which includes:
    a) reducing differences between calculated color coordinates for filtered red light, filtered green light and filtered blue light formed in step 2 and the specified desired color coordinates for those lights;
    b) reducing differences between calculated color coordinates for recombined white light formed in step 3 and the specified desired color coordinates for that light; and
    c) increasing calculated light transmission efficiency for the process of step 1 to 3.

2. The method of claim 1 wherein in step C, the set of filter characteristics for the red, green, and blue filters are specified in terms of cutoff points for the filters.

3. The method of claim 2 wherein the set of filter characteristics are for ideal red, green, and blue filters which respectively correspond to actual red, green, and blue filters, and the cutoff points are equal to the 50% transmission points for the actual filters.

4. The method of claim 1 wherein in step D, the calculated light transmission efficiency is based on a calculated photopic weighted intensity for the target light source spectrum and a calculated photopic weighted intensity for the recombined white light.

5. The method of claim 1 wherein in step D, the target spectrum for the light source or the combination of the target spectrum for the light source and the revised set of filter characteristics for the red, green, and blue filters is determined iteratively.

6. The method of claim 1 wherein in step D only a target spectrum for the light source is determined.

7. A method for determining a target spectrum for a light source to be used in a projection system in which light from the light source is:
1) split into sub-portions either spatially or in time,
2) the sub-portions are filtered through red, green, and blue filters, and
3) the filtered sub-portions are recombined as a colored image on a screen said method comprising:
A) specifying desired color coordinates for red light, green light, and blue light;
B) specifying desired color coordinates for white light produced by way of steps 1 to 3;
C) specifying a set of filter characteristics for the red, green, and blue filters; and
D) determining either
  i) a target spectrum for the light source or
  ii) a combination of a target spectrum for the light source and a revised set of filter characteristics for the red, green, and blue filters based on a combination of criteria which includes:
    a) reducing differences between calculated color coordinates for filtered red light, filtered green light and filtered blue light formed in step 2 and the specified desired color coordinates for those lights;
    b) reducing differences between calculated color coordinates for recombined white light formed in step 3 and the specified desired color coordinates for that light; and
    c) increasing calculated light transmission efficiency for the process of steps 1 to 3;
  wherein in step D, calculated light transmission efficiency is increased by minimizing additional filtering of red light, green light, and blue light beyond that introduced in connection with criterion a.

8. A method for determining a target spectrum for a light source to be used in a projection system in which light from the light source is:
1) split into sub-portions either spatially or in time,
2) the sub-portions are filtered through red, green, and blue filters, and
3) the filtered sub-portions are recombined as a colored image on a screen said method comprising:
A) specifying desired color coordinates for red light, green light, and blue light;
B) specifying desired color coordinates for white light produced by way of steps 1 to 3;
C) specifying a set of filter characteristics for the red, green, and blue filters; and
D) determining either
  i) a target spectrum for the light source or
  ii) a combination of a target spectrum for the light source and a revised set of filter characteristics for the red, green, and blue filters based on a combination of criteria which includes:
    a) reducing differences between calculated color coordinates for filtered red light, filtered preen light and filtered blue light formed in step 2 and the specified desired color coordinates for those lights;
    b) reducing differences between calculated color coordinates for recombined white light formed in step 3 and the specified desired color coordinates for that light; and
    c) increasing calculated light transmission efficiency for the process of steps 1 to 3;
  wherein in step D, criteria a and b are given precedence over criterion c.

9. A method for constructing a projection system comprising:
I) determining a target spectrum for a light source using the method of claim 1;
II) selecting a light source based on step I;
III) selecting red, green, and blue filters based on a set of target filter characteristics for those filters where the set of target filter characteristics are either the set of filter characteristics specified in step C or, if revised, the revised set of filter characteristics determined in step D; and
IV) constructing a projection system using the light source selected in step II and the filters selected in step III.

10. The method of claim 9 wherein the spectrum of the light source selected in step II is not identical to the target spectrum determined in step I.

11. The method of claim 9 wherein the filter characteristics of the red, green, and blue filters selected in step III are not identical to the set of target filter characteristics.

12. The method of claim 9 wherein the projection system constructed in step IV has a calculated light transmission efficiency for the splitting/filtering/recombining process of at least 75%.

13. The method of claim 9 wherein the projection system constructed in step IV has a calculated light transmission efficiency for the splitting/filtering/recombining process of at least 85%.

14. The method of claim 9 wherein the projection system constructed in step IV has a calculated light transmission efficiency for the splitting/filtering/recombining process of at least 95%.

15. A method, comprising:
providing a source spectrum;
determining a blue filter long wavelength cutoff, for transmitting wavelengths less than the blue filter long wavelength cutoff and blocking wavelengths greater than the blue filter long wavelength cutoff;
determining a green filter short wavelength cutoff and a green filter long wavelength cutoff, for blocking wavelengths less than the green filter short wavelength cutoff, for transmitting wavelengths between the green filter short wavelength cutoff and the green filter long wavelength cutoff, and for blocking wavelengths greater than the green filter long wavelength cutoff;
determining a red filter short wavelength cutoff, for blocking wavelengths less than the red filter short wavelength cutoff and transmitting wavelengths greater than the red filter short wavelength cutoff;
forming a blue channel spectrum from the source spectrum and the blue filter long wavelength cutoff;
forming a green channel spectrum from the source spectrum, the green filter short wavelength cutoff and the green filter long wavelength cutoff;
forming a red channel spectrum from the source spectrum and the red filter short wavelength cutoff;
forming a white channel spectrum from the blue channel spectrum, the green channel spectrum and the red channel spectrum;
calculating blue color coordinates from the blue channel spectrum;
calculating green color coordinates from the green channel spectrum;
calculating red color coordinates from the red channel spectrum;
calculating white color coordinates from the white channel spectrum;
forming a blue color difference from the blue color coordinates and desired blue color coordinates;
forming a green color difference from the green color coordinates and desired green color coordinates;
forming a red color difference from the red color coordinates and desired red color coordinates;
forming a white color difference from the white color coordinates and desired white color coordinates;
calculating a source intensity from the source spectrum;
calculating a white intensity from the white channel spectrum;
forming an intensity difference from the white intensity and the source intensity; and
adjusting at least one of:
the source spectrum,
the blue filter long wavelength cutoff,
the green filter short wavelength cutoff,
the green filter long wavelength cutoff, or
the red filter short wavelength cutoff;
to minimize at least one of:
the blue color difference,
the green color difference,
the red color difference,
the white color difference, or
the intensity difference.

16. The method of claim 15, wherein the blue color coordinates, the green color coordinates, the red color coordinates and the white color coordinates are all numerical pairs.

17. The method of claim 16, wherein the desired blue color coordinates, the desired green color coordinates, the desired red color coordinates and the desired white color coordinates are all 1931 CIE color coordinates.

18. The method of claim 15, wherein the source intensity is calculated by integrating the source spectrum from 390 nm to 770 nm.

19. The method of claim 15, wherein the source intensity is calculated by integrating from 390 nm to 770 nm a product of the source spectrum and a filter having the sensitivity of the human eye.

20. The method of claim 15, wherein the white intensity is calculated by integrating the white channel spectrum from 390 nm to 770 nm.

21. The method of claim 15, wherein the white intensity is calculated by integrating from 390 nm to 770 nm a product of the white channel spectrum and a filter having the sensitivity of the human eye.

22. The method of claim 15, wherein the white intensity is at least 75% of the source intensity.

23. The method of claim 22, wherein the white intensity is at least 85% of the source intensity.

24. The method of claim 23, wherein the white intensity is at least 95% of the source intensity.

25. The method of claim 15, wherein the blue filter long wavelength cutoff, the green filter short wavelength cutoff, the green filter long wavelength cutoff and the red filter short wavelength cutoff each corresponds to an idealized transmission profile and defines a boundary between a 0% transmission region and a 100% transmission region.

26. The method of claim 15, wherein the blue filter long wavelength cutoff, the green filter short wavelength cutoff, the green filter long wavelength cutoff and the red filter short wavelength cutoff each corresponds to a 50% transmission point on an actual transmission profile.

27. The method of claim 15,
wherein the blue filter long wavelength cutoff is different from the green filter short wavelength cutoff; and
wherein the green filter long wavelength cutoff is different from the red filter short wavelength cutoff.

* * * * *

UNITED STATES PATENT AND TRADEMARK OFFICE
CERTIFICATE OF CORRECTION

PATENT NO. : 7,142,302 B2  
APPLICATION NO. : 10/695844  
DATED : November 28, 2006  
INVENTOR(S) : Simon Magarill It is certified that error appears in the above-identified patent and that said Letters Patent is hereby corrected as shown below:

In Col. 1, line 64, delete "Modem" and insert -- Modern --, therefor.

In Col. 7, line 5, in Claim 1, after "screen" insert -- , --.

In Col. 7, line 28, (Approx.), in Claim 1, delete "step" and insert -- steps --, therefor.

In Col. 7, line 57, (Approx.), in Claim 7, after "screen" insert -- ; --.

In Col. 8, line 25, in Claim 8, after "screen" insert -- , --.

In Col. 8, line 39, in Claim 8, delete "preen" and insert -- green --, therefor.

Signed and Sealed this

Sixth Day of March, 2007

JON W. DUDAS  
*Director of the United States Patent and Trademark Office*